(12) United States Patent
Bok et al.

(10) Patent No.: US 9,643,566 B2
(45) Date of Patent: May 9, 2017

(54) HEIGHT ADJUSTER OF SEAT BELT FOR VEHICLE

(71) Applicants: Hyundai Motor Company, Seoul (KR); Kia Motors Corp., Seoul (KR); Samsong Industries Ltd., Seoul (KR)

(72) Inventors: Chang Kyu Bok, Seoul (KR); Choong Sik Shin, Anyang-Si (KR); Kyoung Chul Jung, Gimhae-Si (KR)

(73) Assignees: Hyundai Motor Company, Seoul (KR); Kia Motors Corp., Seoul (KR); Samsong Industries Ltd., Seoul (KR)

( * ) Notice: Subject to any disclaimer, the term of this patent is extended or adjusted under 35 U.S.C. 154(b) by 0 days.

(21) Appl. No.: 14/563,033

(22) Filed: Dec. 8, 2014

(65) Prior Publication Data

US 2016/0068134 A1 Mar. 10, 2016

(30) Foreign Application Priority Data

Sep. 5, 2014 (KR) .......................... 10-2014-0118879

(51) Int. Cl.
*B60R 22/20* (2006.01)
*B60R 22/24* (2006.01)

(52) U.S. Cl.
CPC .......... *B60R 22/203* (2013.01); *B60R 22/201* (2013.01); *B60R 22/202* (2013.01); *B60R 22/24* (2013.01)

(58) Field of Classification Search
CPC ..... B60R 22/20; B60R 22/201; B60R 22/202; B60R 22/203
See application file for complete search history.

(56) References Cited

U.S. PATENT DOCUMENTS

| 4,398,749 A | * | 8/1983 | Hipp | B60R 22/203 280/801.1 |
| 4,500,115 A | * | 2/1985 | Ono | B60R 22/203 280/801.2 |
| 4,508,363 A | * | 4/1985 | Temple | B60R 22/20 280/801.2 |

(Continued)

FOREIGN PATENT DOCUMENTS

| JP | 8-142795 A | 6/1996 |
| JP | 2005-132229 A | 5/2005 |

(Continued)

*Primary Examiner* — Barry Gooden, Jr.
(74) *Attorney, Agent, or Firm* — Morgan, Lewis & Bockius LLP

(57) ABSTRACT

A height adjuster of a seat belt for a vehicle may include a rail bracket configured to be fixedly mounted on a vehicle body so that rail grooves are formed to be continuously connected and the rail grooves are vertically disposed on the rail bracket, a slider configured to be coupled to the rail bracket and moving along a length direction of the rail bracket and having left and right surfaces provided with guide grooves so as to be fitted in edge portions of the rail bracket which are provided with the rail grooves, and a locking mechanism configured to be coupled to the slider so as to elastically slidably move and restrict a movement of the slider at a time of contacting the rail groove and release the restriction of the movement of the slider at a time of being separated from the rail groove.

11 Claims, 8 Drawing Sheets

(56) References Cited

U.S. PATENT DOCUMENTS

| | | | | |
|---|---|---|---|---|
| 4,556,255 | A | * | 12/1985 | Kawai .................. B60R 22/203 280/801.2 |
| 4,640,550 | A | * | 2/1987 | H.ang.kansson ..... B60R 22/203 280/801.2 |
| RE32,448 | E | * | 6/1987 | Anderson ............... B60R 22/20 280/801.1 |
| 4,973,084 | A | * | 11/1990 | Biller .................... B60R 22/201 248/297.31 |
| 5,186,495 | A | * | 2/1993 | Boumarafi ............ B60R 22/202 280/801.2 |
| 6,334,629 | B1 | * | 1/2002 | Griesemer ............ B60R 22/203 280/801.2 |
| 6,336,663 | B1 | | 1/2002 | Ando |
| 9,027,964 | B2 | * | 5/2015 | Neero ................... B60R 22/202 280/804 |
| 2010/0018016 | A1 | | 1/2010 | Omiya et al. |
| 2014/0042282 | A1 | * | 2/2014 | Neero ................... B60R 22/202 248/297.31 |

FOREIGN PATENT DOCUMENTS

| | | |
|---|---|---|
| KR | 20-0121353 Y1 | 5/1995 |
| KR | 10-0163492 B1 | 12/1998 |
| KR | 20-1999-0031758 U | 7/1999 |
| KR | 10-2014-0007905 A | 1/2014 |

\* cited by examiner

HEIGHT ADJUSTER OF SEAT BELT FOR VEHICLE

CROSS REFERENCE TO RELATED APPLICATION

The present application claims priority to Korean Patent Application No. 10-2014-0118879, filed Sep. 5, 2014, the entire contents of which is incorporated herein for all purposes by this reference.

BACKGROUND OF THE INVENTION

Field of the Invention

The present invention relates to a technology of a height adjuster of a seat belt for a vehicle capable of controlling a height of the seat belt to suit a passenger's body type.

Description of Related Art

A vehicle is provided with a seat belt which protects safety of a passenger by restricting an upper body of a seated passenger at the time of the occurrence of accidents. As illustrated in FIG. 1, a seat belt 1 has a structure in which a tongue 2 mounted on the seat belt 1 is fastened with a buckle 3 mounted on a vehicle body to make the passenger wear the seat belt 1.

One end of the seat belt 1 is fixedly mounted on the vehicle body via a lower anchor 4, the other end thereof is wound to be able to be elastically drawn from or in a reel machine 5 such as a pre-tensioner, and a middle portion thereof penetrates through a middle anchor 6 and the middle anchor 6 is coupled with a height adjuster 8 which may vertically adjust a height of a pillar part 7 (center pillar) of the vehicle body.

Therefore, the height adjuster 8 is operated to vertically adjust the height of the seat belt 1, and the height adjuster 8 which generally includes a multi-stage rail groove is configured to include a rail bracket fixedly mounted on the vehicle body to vertically dispose the rail groove, a slider coupled with the rail bracket to vertically move along the rail groove, and a locking mechanism mounted on the slider to restrict a vertical movement of the slider with respect to the rail bracket and release a restriction of the vertical movement of the slider with respect to the rail bracket and the middle anchor 6 is coupled with the slider.

Meanwhile, the height adjuster 8 is manually operated by a passenger, and therefore the height adjuster 8 needs to be conveniently operated. To pursue the convenience of the operation, the height adjuster 8 is preferable to have a simple structure and to improve noise and is more preferable to have a structure improving a connection problem of the slider with the rail bracket. As a result, a development of a height adjuster with an improved structure is urgently required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a height adjuster of a seat belt for a vehicle capable of being conveniently operated, reducing a weight, and saving costs by simplifying a structure and improving a noise problem by improving a connection problem of a slider with a rail bracket.

According to various aspects of the present invention, a height adjuster of a seat belt for a vehicle may include a rail bracket configured to be fixedly mounted on a vehicle body so that rail grooves are formed to be continuously connected and the rail grooves are vertically disposed on the rail bracket, a slider configured to be coupled to the rail bracket and moving along a length direction of the rail bracket and having left and right surfaces provided with guide grooves so as to be fitted in edge portions of the rail bracket which are provided with the rail grooves, and a locking mechanism configured to be coupled to the slider so as to elastically slidably move and restrict a movement of the slider at a time of contacting the rail groove and release the restriction of the movement of the slider at a time of being separated from the rail groove.

The rail bracket may include a bottom portion fixedly mounted on the vehicle body, and a pair of flange parts of both sides of the bottom portion, formed to be bent in a C-letter shape from the bottom portion, in which the pair of flange parts may be fitted in the guide grooves of the slider while surfaces facing each other of the flange parts are spaced apart from each other, and the rail grooves may be vertically connected continuously along edges facing each other of the flange parts.

Each rail groove may be provided with a vertical extending part, a horizontal locking part, and an inclined part which are formed to be continuously connected from a lower end of each flange part to an upper end thereof.

The slider may include a base part and an upper part configured to be overlappingly coupled with a front surface of the base part, the guide grooves may be formed on both sides of the upper part, and the locking mechanism may be disposed in a space between the base part and the upper part.

The base part may be penetrately provided with a pair of base slots which are spaced apart from each other, and may be provided with a base protrusion to which a middle anchor fitted with the seat belt is coupled.

The upper part may be penetrately provided with a pair of upper slots which are spaced apart from each other, a position in one direction based on the upper slots may be provided with a protrusion coupling hole in which the base protrusion is fitted, a position in another direction based on the upper slots may be provided with a lever operating hole, a spring mounting hole may be disposed between the pair of upper slots while being formed between the upper slots and the protrusion coupling hole, and the upper slots may be disposed above the base slots when the base part is coupled with the upper part.

The locking mechanism may include a pair of locking fins each configured to have both ends fitted in the base slots and the upper slots and an outer circumference contacting the rail grooves while moving along a length direction of the base and upper slots, a locking fin spring mounted to be supported to the locking fins while being fixed to the upper part and configured to apply an elastic force to the locking fins to contact the rail grooves at all times, a locking lever mounted to contact the locking fins while penetrating through the lever operating hole and configured to apply an external force to the locking fins so that an interval between the pair of locking fins is narrow when the locking lever moves in a direction in which the locking lever approaches the locking fins along the lever operating hole, and a lever spring configured to have one end supported to the upper part and another end supported to the locking lever and apply an elastic force to the locking lever so that the locking lever moves in a direction in which the locking lever is far away from the locking fins at all times.

The locking fin spring may include a middle portion configured to be fitted in the spring mounting hole, and support parts of both ends configured to elastically support an inner circumference of the locking fins so that the interval between the locking fins is widened while being formed to be widened to both sides based on the middle portion.

The locking lever may include a lever part configured to be movably mounted in a direction in which the lever part approaches the locking fins along the lever operating hole while penetrating through the lever operating hole or in a direction opposite thereto, and a pair of lever rod parts mounted to contact the outer circumferences of the locking fins while being formed to be widened to both sides based on the lever part and apply an external force to the locking fins so that the interval between the pair of locking fins is narrow when the lever part moves in a direction in which the lever part approaches the locking fins.

Each locking fin may include a small diameter part of one side configured to move along the base slot while being inserted into the base slot, a large diameter part configured to have a larger diameter than the small diameter part while being integrally formed with the small diameter part, and in the large diameter part, a surface of one end connected to the small diameter part may be laid on a surface of the base part so as not to be fitted in the base slot and another end which is not connected to the small diameter part may move along the upper slot while being inserted into the upper slot.

The small diameter part and the large diameter part may have a same axis center.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
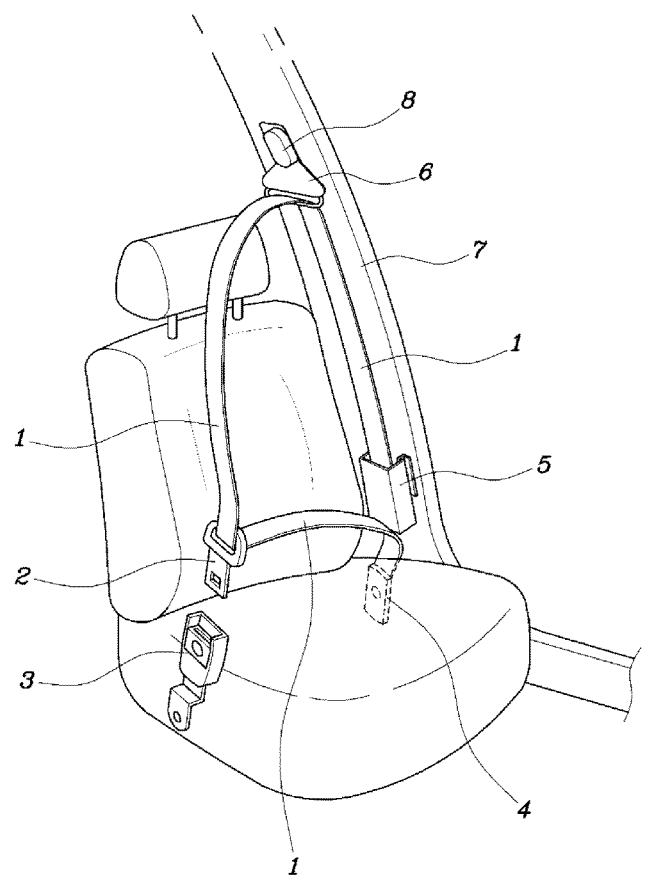
FIG. 1 is a diagram illustrating a mounting structure of a seat belt in the related art.
Figure 2:
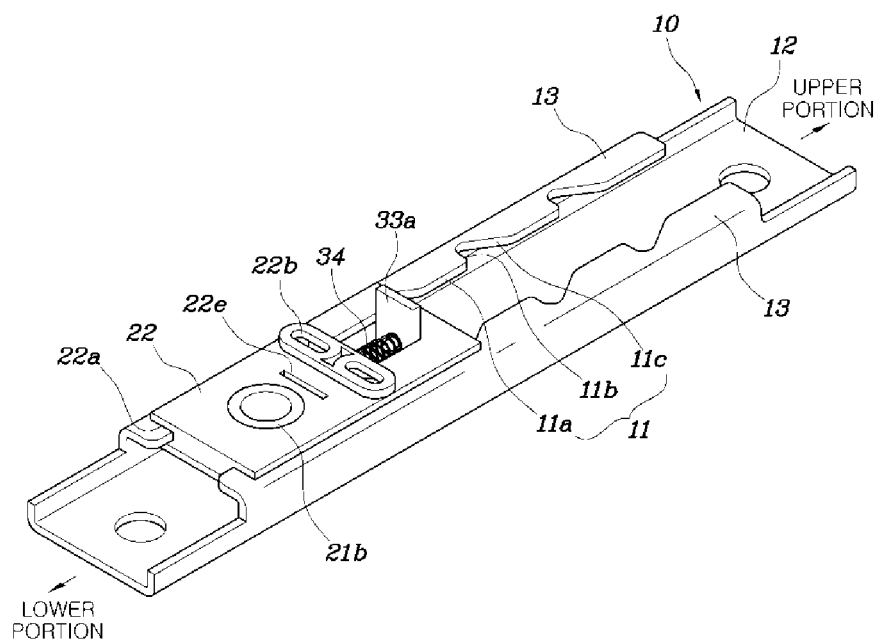
FIG. 2, FIG. 3 and FIG. 4 are a perspective view, a front view, and an exploded perspective view, respectively, of an exemplary height adjuster of a seat belt according to the present invention.
Figure 3:
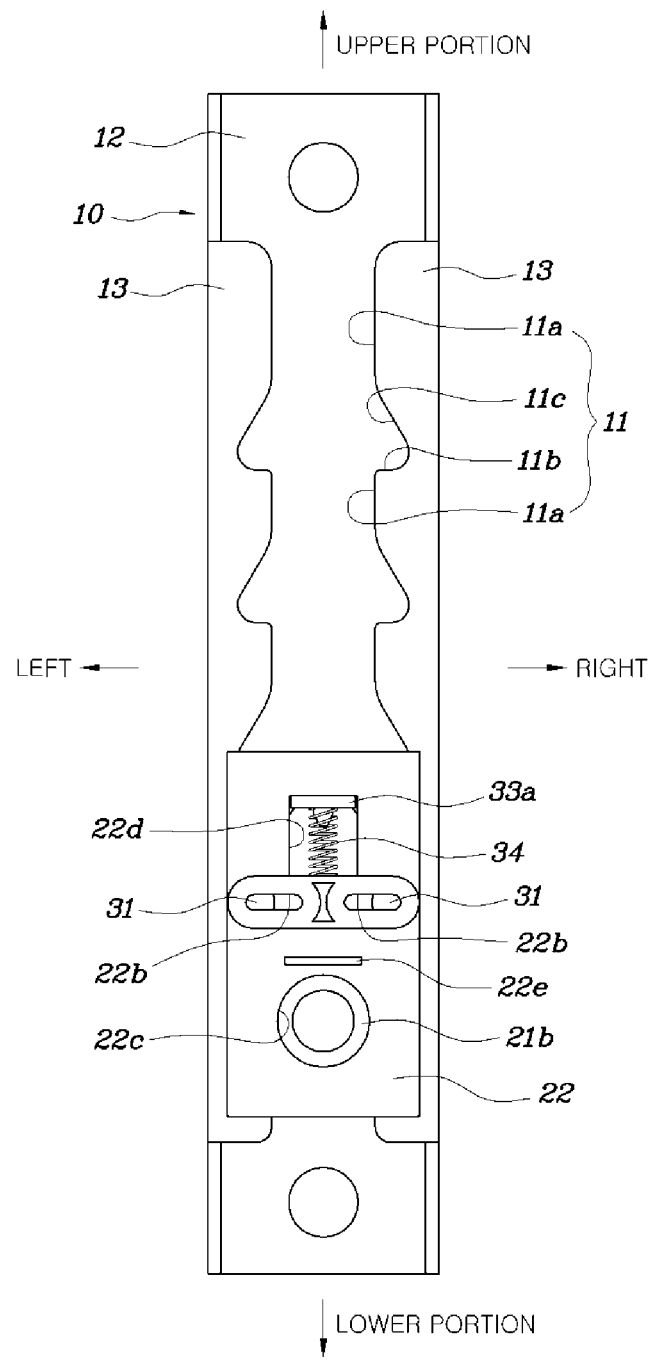
Figure 4:
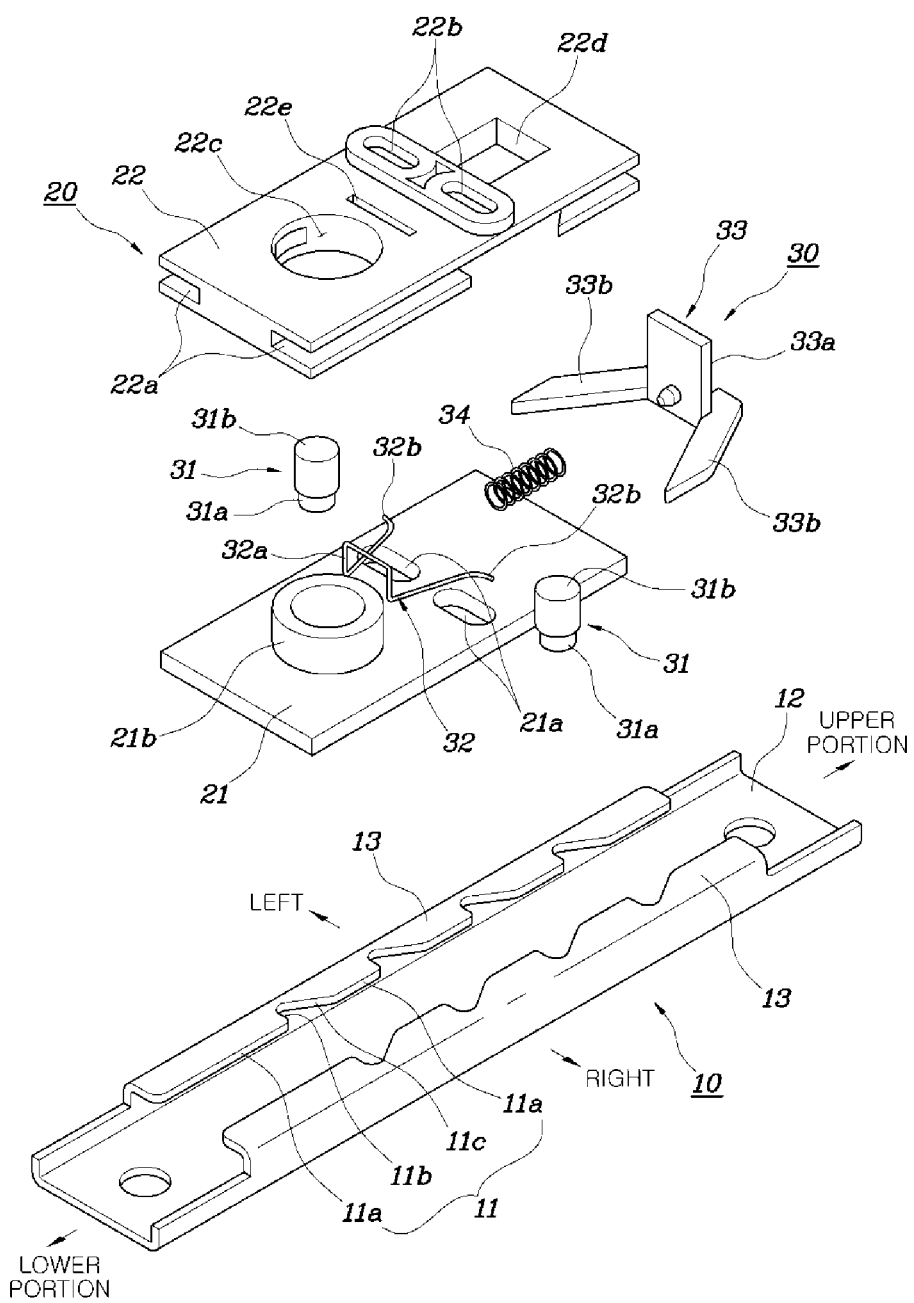
Figure 5:
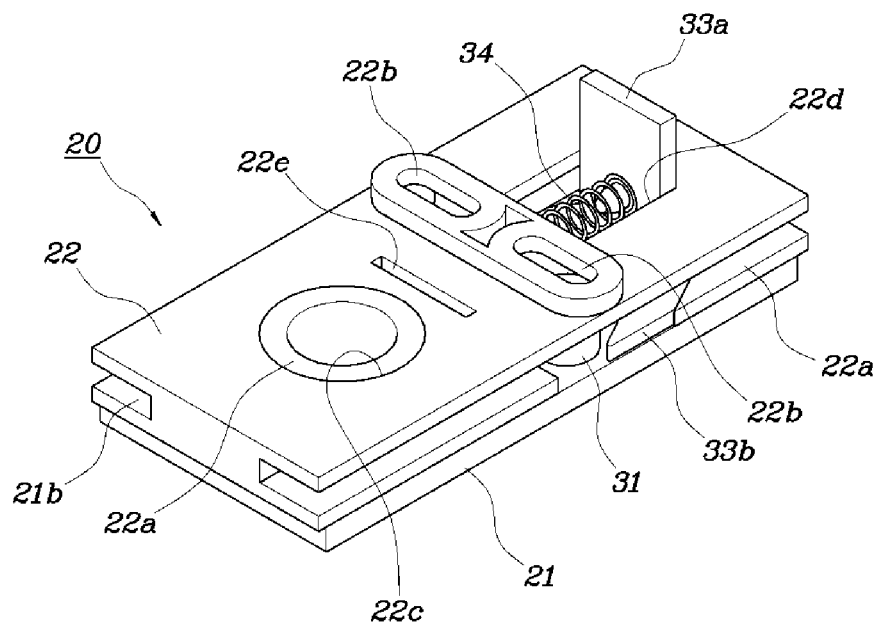
FIG. 5 is a perspective view of a coupled state between a slider and a locking mechanism according to the present invention.
Figure 6:
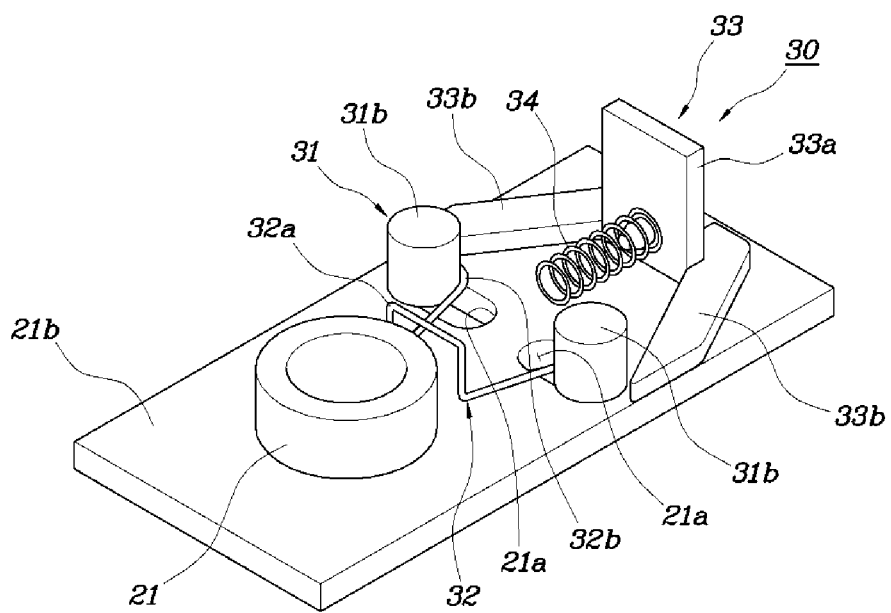
FIG. 6 is a diagram illustrating a state in which an upper part of the slider is removed from FIG. 5.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As illustrated in FIG. 2, FIG. 3, FIG. 4, FIG. 5 and FIG. 6, the height adjuster of a seat belt according to various embodiments of the present invention includes a rail bracket 10 configured to be fixedly mounted on a vehicle body so that the rail grooves 11 are formed to be continuously connected and the rail grooves 11 are vertically disposed, a slider 20 configured to be coupled with the rail bracket 10 so as to move along a length direction of the rail bracket 10 and have left and right surfaces provided with guide grooves 22a so as to be fitted in edge portions of the rail bracket 10 which are provided with the rail grooves 11, and a locking mechanism 30 configured to be coupled with the slider 20 so as to elastically slidably move and restrict a movement of the slider 20 at the time of contacting the rail groove 11 and release the restriction of the movement of the slider 20 at the time of being separated from the rail groove 11.

According to various embodiments of the present invention, the rail bracket 10 has a structure in which the rail grooves 11 are formed to be vertically connected continuously, and therefore the slider 20 may continuously move downward at the time of an unlocking state of the locking mechanism 30 and the slider 20 may continuously move upward even at the time of a locking state of the locking mechanism 30, such that a vertical height of a seat belt 1 (e.g. seat belt 1 of FIG. 1) may be more stably controlled.

The slider 20 is coupled to a middle anchor 6 (e.g. middle anchor 6 illustrated in FIG. 1) and the middle anchor 6 has a structure to make the seat belt 1 penetrate therethrough. Therefore, when the slider 20 moves along the rail bracket 10, the height of the seat belt 1 may be adjusted to meet a body type of a seated passenger.

Further, according to various embodiments of the present invention, the slider 20 is provided with a guide groove 22a and in rail bracket 10, the edge portions provided with the rail grooves 11 are fitted in the guide grooves 22a. Therefore, according to various embodiments of the present invention, it is possible to smooth an operation and minimize operation noise by minimizing a connection occurrence between the rail bracket 10 corresponding to a fixing body and the slider 20 corresponding to a mobile body.

Meanwhile, the rail bracket 10 includes a bottom portion 12 configured to be fixedly mounted on the vehicle body (center pillar, e.g. pillar part 7 of FIG. 1) and a pair of flange parts 13 of both sides formed to be bent in a C-letter shape from the bottom portion 12, in which the pair of flange parts 13 are fitted in the guide grooves 22a of the slider 20 while surfaces facing each other of the flange parts 13 being spaced apart from each other and the rail grooves 11 are vertically connected continuously along edges facing each other of the flange parts 13.

Further, the rail groove 11 has a structure in which a vertical extending part 11a, a horizontal locking part 11b, and an inclined part 11c are formed to be continuously connected from a lower end of the flange part 13 to an upper end and when the horizontal locking part 11b contacts a locking fin 31 to be described below, a downward movement of the slider 20 is restricted.

The slider 20 includes a base part 21 and an upper part 22 overlappingly coupled with a front surface of the base part 21, the guide grooves 22a are formed on both sides of the upper part 22, and the locking mechanism 30 is disposed in a space between the base part 21 and the upper part 22.

When the base bracket 10 is coupled with the slider 20, the base part 21 is disposed in an inner space of the base bracket 10 so as not to be exposed to the outside and the upper part 22 is disposed outside the base bracket 10 to be exposed to the outside.

Here, the base part 21 is penetrately provided with a pair of base slots 21a which are spaced apart from each other and is provided with a base protrusion 21b with which the middle anchor 6 fitted with the seat belt 1 is coupled.

Further, the upper part 22 is penetrately provided with a pair of upper slots 22b which are spaced apart from each other in a horizontal direction, a position in one direction based on the upper slot 22b is provided with a protrusion coupling hole 22c in which the base protrusion 21b is fitted, a position in the other direction based on the upper slot 22b is provided with a lever operating hole 22d, and a spring mounting hole 22e is formed to be disposed between the pair of upper slots 22b while being formed between the upper slot 22b and the protrusion coupling hole 22c.

The upper slot 22b is disposed above the base slot 21a when the base part 21 is coupled to the upper part 22, that is, the base slot 21a and the upper slot 22b are formed to be disposed on the same axis.

The locking mechanism 30 includes a pair of locking fins 31 configured to have both ends fitted in the base slot 21a and the upper slot 22b and an outer circumference contacting the rail groove 11 while moving along a length direction of the slots 21a and 22b, a locking fin spring 32 mounted to be supported to the locking fin 31 while being fixed to the upper part 22 and configured to apply an elastic force to the locking fin 31 to contact the rail groove 11 at all times, a locking lever 33 mounted to contact the locking fin 31 while penetrating through the lever operating hole 22d and configured to apply an external force to the locking fin 31 so that an interval between the pair of locking fins 31 is narrow when the locking lever 33 moves in a direction in which the locking lever 33 approaches the locking fin 31 along the lever operating hole 22d; and a lever spring 34 configured to have one end supported to the upper part 22 and the other end supported to the locking lever 33 and apply an elastic force to the locking lever 33 so that the locking lever 33 moves in a direction in which the locking lever 33 is far away from the locking fin 31 at all times.

In this configuration, the locking fin spring 32 includes a middle portion 32a configured to be fitted in the spring mounting hole 22e and support parts 32b of both ends configured to elastically support an inner circumference of the locking fin 31 so that the interval between the locking fins 31 is widened while being formed to be widened to both sides based on the middle portion 32a.

Both ends of the support part 32b are formed to be widened in a V-letter shape based on the middle portion 32a while being integrally formed with the middle portion 32a and the support part 32b has elasticity to be widened to the outside at all times and therefore the pair of locking fins 31 receives the elastic force of the support part 32b to widen the interval therebetween.

Further, the locking lever 33 includes a lever part 33a configured to be movably mounted in a direction in which the lever part 33a approaches the locking fin 31 along the lever operating hole 22d while penetrating through the lever operating hole 22d or in a direction opposite thereto and a pair of lever rod parts 33b mounted to contact an outer circumference of the locking fin 31 while being formed to be widened to both sides based on the lever part 33a and apply an external force to the locking fin 31 so that the interval between the pair of locking fins 31 is narrow when the lever part 33a moves in a direction in which the lever part 33a approaches the locking fin 31.

The lever rod part 33b is formed to be widened in a V-letter shape based on the lever part 33a while being integrally formed with the lever part 33a.

The locking fin 31 includes a small diameter part 31a of one side configured to move along the slot 21a while being inserted into the base slot 21a and a large diameter part 31b configured to have a larger diameter than the small diameter part 31a while being integrally formed with the small diameter part 31a.

In the large diameter part 31b, the surface of one end connected to the small diameter part 31a is laid on the surface of the base part 21 so as not to be fitted in the base slot 21a and in the large diameter part 31b, the other end which is not connected to the small diameter part 31a moves along the slot 22b while being inserted into the upper slot 22b.

Further, the small diameter part 31a and the large diameter part 31b have the same axis center so that the locking fin 31 may smoothly move along the slots 21a and 22b when the elastic force of the locking fin spring 32 is applied or the locking lever 33 applies an external force.

Hereinafter, the operation of various embodiments of the present invention will be described.

Figure 7:
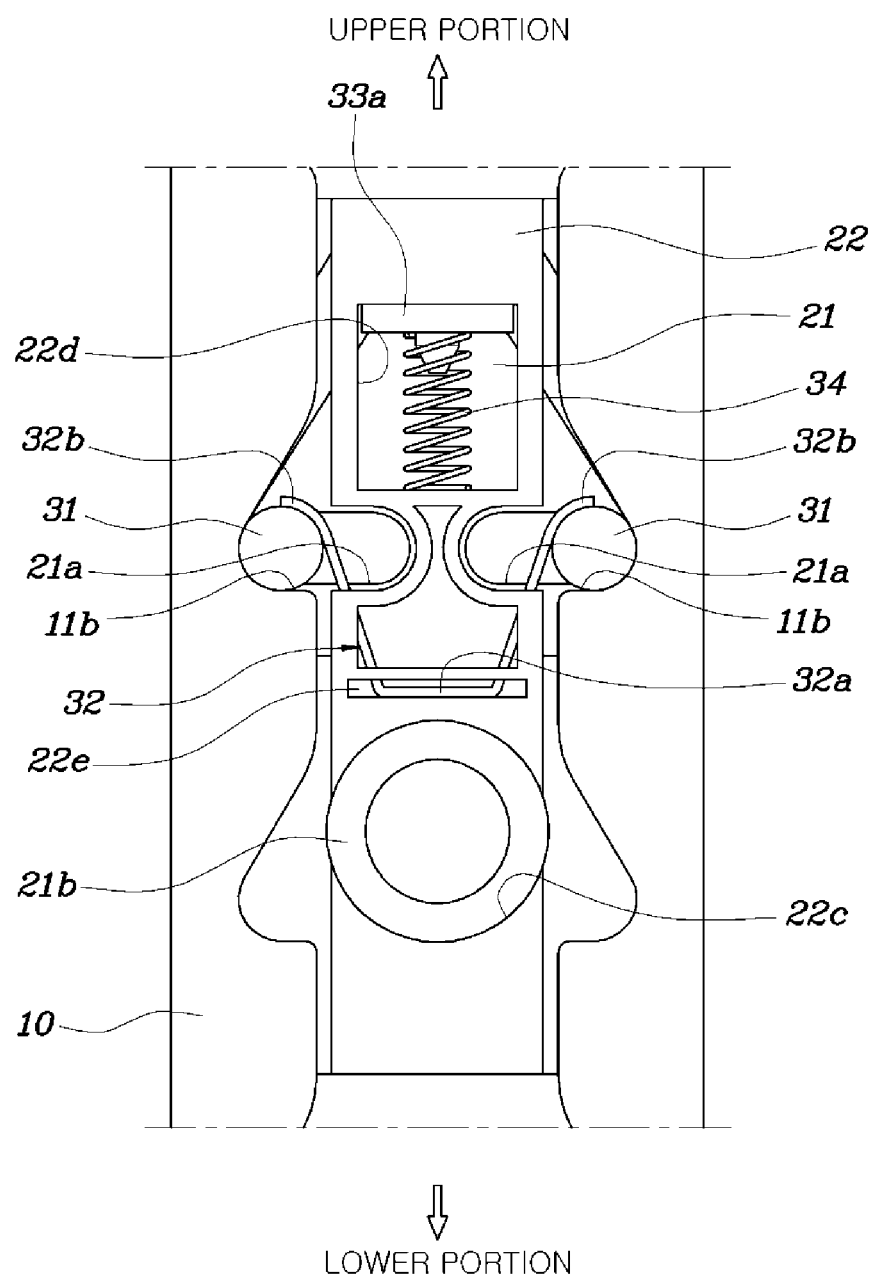
FIG. 7, FIG. 8 and FIG. 9 are diagrams for describing a locking state, a downward operating state, and an upward operating state of the exemplary height adjuster of the seat belt according to the present invention.

A state illustrated in FIG. 7 is a state in which the pair of locking fins 31 is maximally widened to the outside by the elastic force of the locking fin spring 32 to be locked to the horizontal locking groove 11b of the rail groove 11 and is a state (that is, a state in which the locking lever 33 is disposed at a top end of the lever operating hole 22b) in which the locking lever 33 is spaced apart from the locking fin 31 as far as possible by the elastic force of the lever spring 34. In this case, the slider 20 is in a locking state in which the slider 20 does not move in a downward direction of the base bracket 10 along the rail groove 11 as long as the external force is not applied to the locking lever 33.

Figure 8:
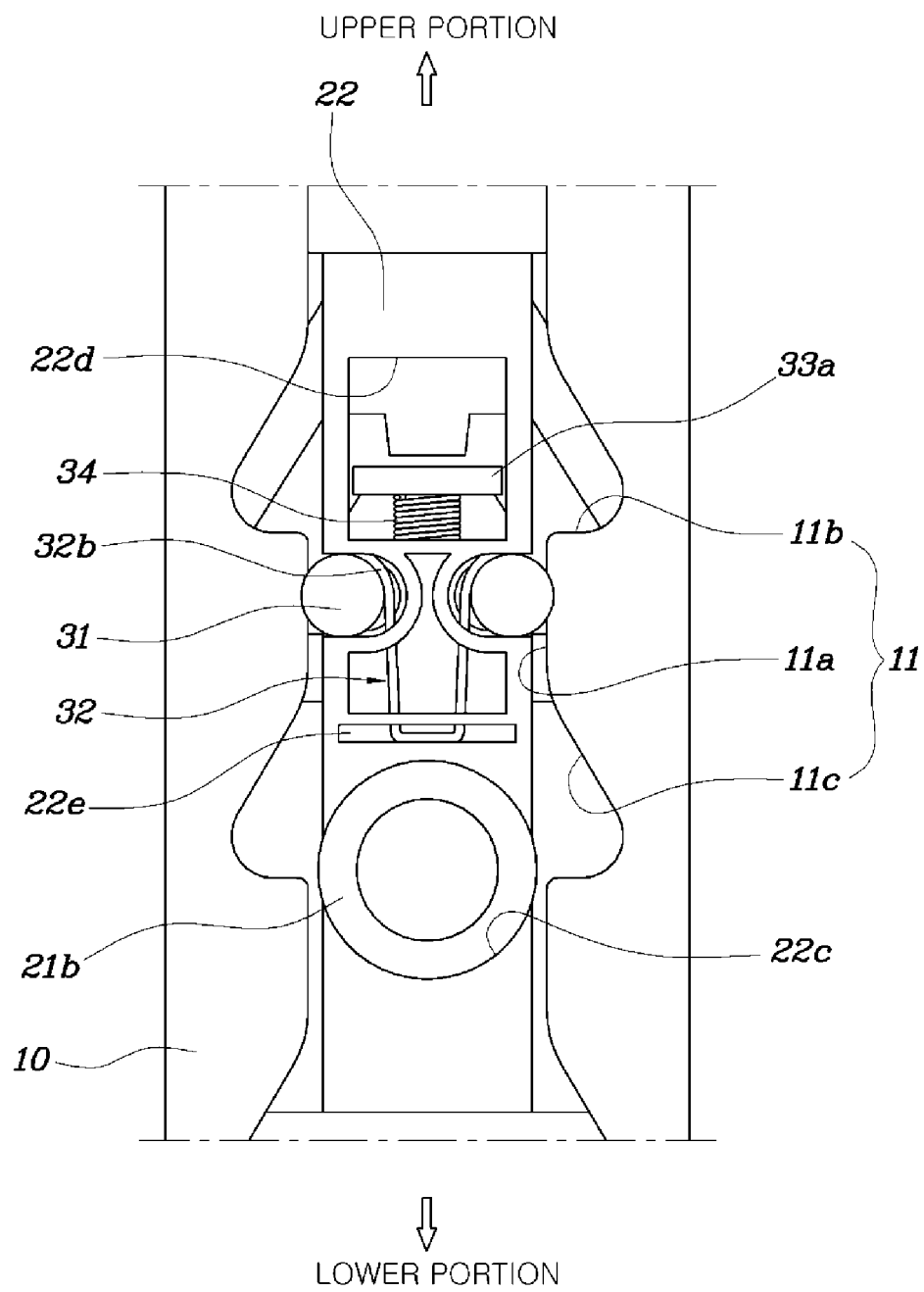
Figure 9:
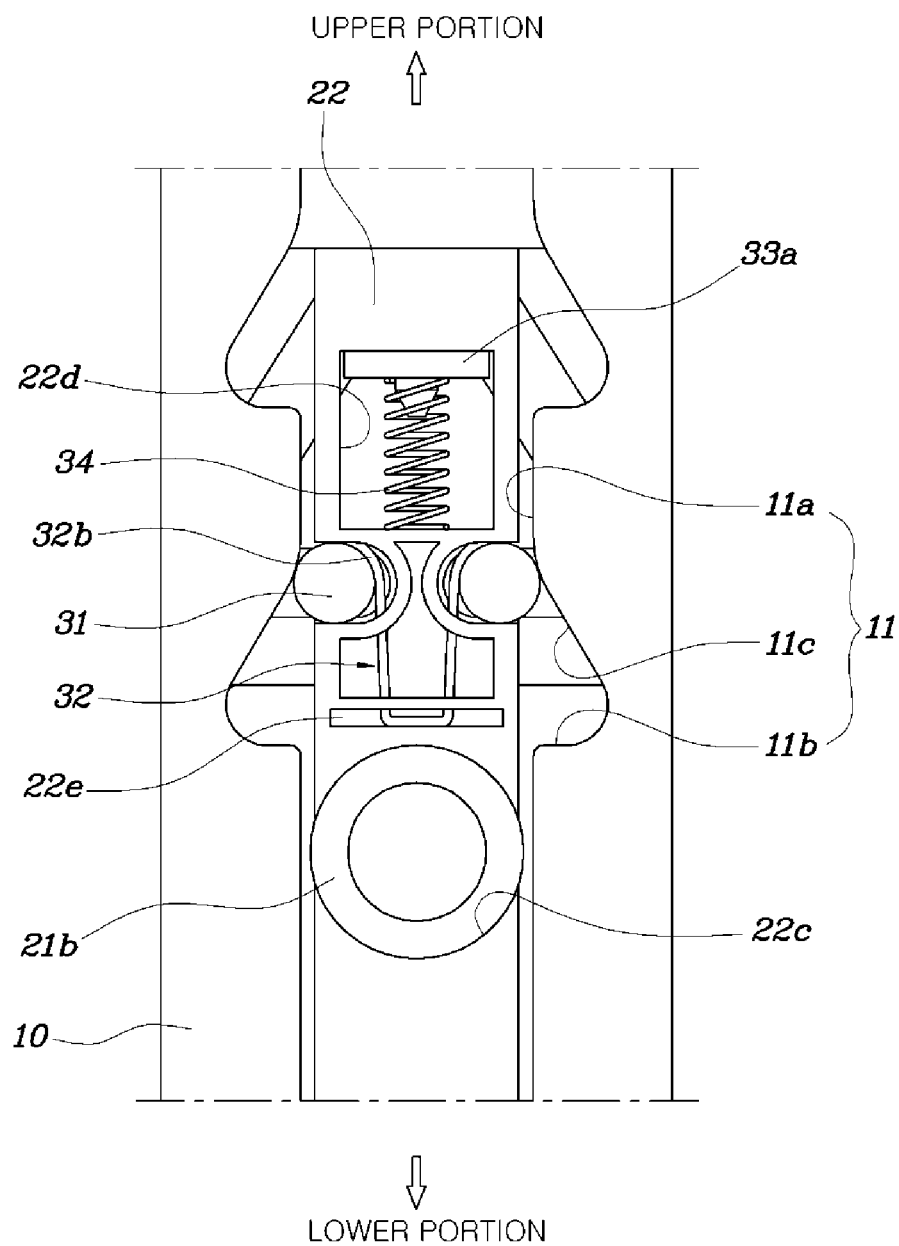

When the user operates the locking lever 33 in the locking state as illustrated in FIG. 7 to make the locking lever 33 move in the downward direction of the lever operating hole 22b as illustrated in FIG. 8, that is, the locking lever 32 moves toward the locking fin 31, the lever rod part 33b presses an outer circumference of the locking fin 31, such that the pair of locking fins 31 moves to the inside so as to approach each other along the base slot 21a and the upper slot 22b. In this case, the locking fin 31 is separated from the horizontal locking groove 11*b* and at the same time, the support part 32*b* of the locking fin spring 32 is narrow to the inside.

As described above, when the locking fin 31 is separated from the horizontal locking groove 11*b*, the slider 20 may move in the downward direction of the base bracket 10 along the rail groove 11. As a result, the seated passenger adjusts the height of the seat belt 1 down (downward direction) to suit a body type by the movement in a downward direction of the slider 20 and then disposes the seat belt 1 at the position of the horizontal locking groove 11*b* of the desired position and releases the operation of the locking lever 33 to keep the locking state as illustrated in FIG. 7 so as to keep the state in which the height adjustment of the seat belt 1 in the downward direction is completed.

Further, when the user pushes only the slider 20 upward without operating the locking lever 33 in the locking state as illustrated in FIG. 7, the locking fin 31 disposed at the horizontal locking groove 11*b* interlocks with the upward movement of the slider 20 to move along the inclined part 11*c* of the rail groove 11. In this case, the support part 32*b* of the locking fin spring 32 is narrow to the inside.

The locking fin 31 disposed at the inclined part 11*c* by the continuously upward movement of the slider 20 moves along the vertical extending part 11*a* and then is disposed at the horizontal locking groove 11*b* disposed at the upper portion. In this case, the locking fin 31 is widened to the outside by a recovery of the locking fin spring 32 and thus is locked to the horizontal locking groove 11*b*. As a result, the slider 20 moving upward keeps the locking state as illustrated in FIG. 7 to keep the state in which the height adjustment of the seat belt 1 in the upward direction is completed.

As described above, according to various embodiments of the present invention, the user operates the locking lever 33 at the time of the height adjustment of the seat belt 1 in the downward direction, and to the contrary, only the slider 20 moves upward without operating the locking lever 33 at the time of the upward adjustment, thereby making the operation convenient and simple.

Further, according to various embodiments of the present invention, the configuration of the slider 20 and the locking mechanism 30 are relatively simple and therefore the user may easily perform the operation with the simple operation without the large operation force, the number of parts and the weight may be reduced, and the costs may be saved.

Further, according to various embodiments of the present invention, the slider 20 is provided with the guide groove 22*a* and the edge portions of the rail bracket 10 provided with the rail grooves 11 are fitted in the guide grooves 22*a*. Therefore, it is possible to smooth the operation and minimize the operation noise by minimizing the connection occurrence between the rail bracket 10 corresponding to the fixing body and the slider 20 corresponding to a mobile body.

Further, according to various embodiments of the present invention, the rail bracket 10 has a structure in which the rail grooves 11 are formed to be continuously connected along a vertical direction, and therefore the slider 20 may continuously move downward at the time of the unlocking state of the locking mechanism 30 and the slider 20 may continuously move upward even at the time of a locking state of the locking mechanism 30, such that the vertical height of the seat belt 1 may be more stably controlled.

According to various embodiments of the present invention, it is possible to make the operation of the height adjuster convenient and simple by allowing the user to operate the locking lever only when the height of the seat belt is adjusted downward and to move only the slider upward without operating the locking lever when the height of the seat belt is adjusted upward, facilitate and simplify the operation and reduce the number of parts and the weight and save the costs by making the configuration of the slider and the locking mechanism relatively simple, and smooth the operation and minimize the operation noise by minimizing the connection occurrence between the rail bracket corresponding to the fixing body and the slider corresponding to the mobile body.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A height adjuster of a seat belt for a vehicle, comprising:
   a rail bracket configured to be fixedly mounted on a vehicle body wherein rail grooves are formed to the rail bracket and are vertically disposed on the rail bracket;
   a slider configured to be coupled to the rail bracket and moving along a length direction of the rail bracket and having first and second surfaces provided with guide grooves so as to be fitted in edge portions of the rail bracket provided with the rail grooves; and
   a locking mechanism configured to be coupled to the slider so as to elastically slidably move and restrict a movement of the slider at a time of contacting the rail grooves and release the restriction of the movement of the slider at a time of being separated from the rail grooves,
   wherein the locking mechanism includes:
      a pair of locking pins each configured to have a first surface contacting one of the rail grooves while moving along a length direction of one of a pair of base slots of a base part and along a length direction of one of a pair of upper slots of an upper part wherein each of the base slots and the upper slots are formed in the slider in a width direction of the rail bracket;
      a locking pin spring mounted to be elastically supported to a second surface of the locking pins while being fixed to the slider and configured to apply an elastic force to the locking pins to contact the rail grooves continuously;
      a locking lever mounted to contact a third surface of the locking pins while penetrating through the slider and configured to apply an external force to the locking pins so that an interval between the pair of locking pins is narrowed when the locking lever moves in the length direction of the rail bracket in which the locking lever approaches the locking pins; and a lever spring configured to have a first end supported to the slider and a second end supported to the locking lever and apply an elastic force to the locking lever so that the locking lever moves in the length direction of the rail bracket in which the locking lever is far away from the locking pins, wherein when a height of the seat belt is adjusted in a downward direction of the vehicle, the slider is configured to be moved in the downward direction along the rail grooves in a state that the locking lever is manipulated and the lever spring is compressed, and wherein when the height of the seat belt is adjusted in an upward direction of the vehicle, the slider is configured to be moved in the upward direction along the rail grooves in a state that the locking lever is not manipulated.

2. The height adjuster of the seat belt for the vehicle of claim 1, wherein the rail bracket includes:

a bottom portion fixedly mounted on the vehicle body; and a pair of flange parts on both sides of the bottom portion, formed to be bent in a C-letter shape from the bottom portion, wherein the pair of flange parts are fitted in the guide grooves of the slider while surfaces facing each other of the flange parts are spaced apart, and wherein the rail grooves are vertically connected continuously along edges facing each other of the flange parts.

3. The height adjuster of the seat belt for the vehicle of claim 2, wherein each of the rail grooves is provided with a vertical extending part, a horizontal locking part, and an inclined part which are formed to be continuously connected from a lower end of each of the flange parts to an upper end thereof.

4. The height adjuster of the seat belt for the vehicle of claim 2, wherein the slider includes the base part and the upper part configured to be overlappingly coupled with a front surface of the base part, the guide grooves are formed on both sides of the upper part, and the locking mechanism is disposed in a space between the base part and the upper part.

5. The height adjuster of the seat belt for the vehicle of claim 4, wherein the base part is penetrately provided with the pair of base slots which are spaced apart from each other, and is provided with a base protrusion to which a middle anchor fitted with the seat belt is coupled.

6. The height adjuster of the seat belt for the vehicle of claim 5, wherein the upper part is penetrately provided with the pair of upper slots spaced apart from each other, a first portion on the upper slots in the length direction of the rail bracket is provided with a protrusion coupling hole in which the base protrusion is fitted, a second portion on the upper slots in the length direction of the rail bracket is provided with a lever operating hole, a spring mounting hole is disposed between the pair of upper slots while being formed between the upper slots and the protrusion coupling hole, and the upper slots are disposed above the base slots when the base part is coupled with the upper part.

7. The height adjuster of the seat belt for the vehicle of claim 6, wherein the pair of locking pins is configured to have both ends fitted in the base slots and the upper slots and move in the width direction of the rail bracket;

the locking pin spring is mounted to be elastically supported to the second surface of the locking pins while being fixed to the upper part;

the locking lever is mounted to contact the third surface of the locking pins while penetrating through the lever operating hole and configured to move along the lever operating hole; and the lever spring is configured to have a first end supported to the upper part and a second end supported to the locking lever.

8. The height adjuster of the seat belt for the vehicle of claim 7, wherein the locking pin spring includes:

a middle portion configured to be fitted in the spring mounting hole; and support parts of both ends configured to elastically support the second surface of the locking pins so that the interval between the locking pins is widened.

9. The height adjuster of the seat belt for the vehicle of claim 7, wherein the locking lever includes:

a lever part configured to be movably mounted in the length direction of the rail bracket in which the lever part approaches the locking pins along the lever operating hole while penetrating through the lever operating hole; and a pair of lever rod parts, formed to be widened to both sides, each of the pair of lever rod parts mounted to contact the third surface of a respective one of the locking pins in the width direction of the rail bracket and apply the external force to the locking pins so that the interval between the pair of locking pins is narrowed when the lever part moves in the width direction of the rail bracket in which the lever part approaches the locking pins.

10. The height adjuster of the seat belt for the vehicle of claim 7, wherein each of the locking pins includes:

a small diameter part of one side configured to move along the base slot while being inserted into the base slot; and a large diameter part configured to have a larger diameter than the small diameter part while being integrally formed with the small diameter part, wherein in the large diameter part, a surface of a first end connected to the small diameter part is laid on a surface of the base part so as not to be fitted in the base slot and a second end which is not connected to the small diameter part moves along the upper slot while being inserted into the upper slot.

11. The height adjuster of the seat belt for the vehicle of claim 10, wherein the small diameter part and the large diameter part have a same axis center.

* * * * *